United States Patent [19]
Funk

[11] Patent Number: 5,132,918
[45] Date of Patent: Jul. 21, 1992

[54] METHOD FOR CONTROL OF A DISTILLATION PROCESS

[76] Inventor: Gary L. Funk, 4444 Westheimer, #328, Houston, Tex. 77027

[21] Appl. No.: 486,222

[22] Filed: Feb. 28, 1990

[51] Int. Cl.$^5$ .......................... B01D 3/42; C10G 21/00
[52] U.S. Cl. ......................................... 364/501; 201/1; 203/2; 208/320; 374/16
[58] Field of Search .................. 364/501, 557; 374/16, 374/20, 25, 143; 201/1, 41; 203/1, 2; 208/347, 41, 319, 320

[56] References Cited

U.S. PATENT DOCUMENTS

| | | | |
|---|---|---|---|
| 2,467,174 | 4/1949 | Wilson | 202/160 |
| 2,684,326 | 7/1954 | Boyd | 202/40 |
| 3,830,698 | 8/1974 | Kleiss | 202/160 |
| 4,262,791 | 4/1981 | Lynch et al. | 364/501 X |
| 4,319,330 | 3/1982 | Furr | 364/501 |
| 4,367,121 | 1/1983 | Furr | 364/501 X |
| 4,488,239 | 12/1984 | Agarwal | 364/557 X |
| 4,544,452 | 10/1985 | Halliday et al. | 364/501 X |
| 4,555,309 | 11/1985 | Jain | 364/501 X |
| 4,558,423 | 12/1985 | Jain | 364/501 |
| 4,560,442 | 12/1985 | Jain | 364/501 X |
| 4,617,092 | 10/1986 | Hiramatsu | 364/501 X |
| 4,624,746 | 11/1986 | Hiramatsu | 203/2 X |
| 4,866,632 | 9/1989 | Mead et al. | 364/501 |
| 4,889,600 | 12/1989 | Meier et al. | 364/501 X |
| 5,047,125 | 9/1991 | Meier et al. | 364/501 X |

OTHER PUBLICATIONS

Hydrocarbon Processing, Mar. 1988, p. 85.
Nelson, W. L. *Petroleum Refinery Engineering*, Chapter V, pp. 85-135, McGraw-Hill (3rd ed. 1949).
Gary, J. H. & Handwerk, G. E. *Petroleum Refining Technology and Economics* Chapter 3, pp. 16-51, Marcel Dekker, Inc. (1975).
Watkins, R. N. *Petroleum Refinery Distillation* Chapter 2, Gulf Publ. Co. (2nd ed. 1979).
*Chemical Engineers' Handbook* Section 22, pp. 22-1 to 22-148, McGraw-Hill (R. H. Perry, consultant 5th ed. 1973).

*Primary Examiner*—Joseph L. Dixon
*Attorney, Agent, or Firm*—Sroufe, Zamecki, Payne & Lundeen

[57] ABSTRACT

A method for automated control of a petroleum distillation column in which signals representing temperatures, pressures and fluid flow rates for selected product streams withdrawn from the column are transmitted to a digital computer where, by means of a programmed algorithm, they are used to derive a true boiling point curve for the petroleum products of such product streams. The true boil point curve is then used to infer selected properties for the petroleum products which are compared with desired properties for the products of the monitored product streams and the differences between the inferred and desired properties are utilized to adjust automatically one or more of the operating parameters for the column so as to move the column's performance incrementally towards optimization.

14 Claims, 5 Drawing Sheets

1. LIGHT STRAIGHT RUN GASOLINE
2. NAPTHA
3. KEROSINE
4. LGO
5. HGO
6. REDUCED CRUDE

METHOD FOR CONTROL OF A DISTILLATION PROCESS

This invention relates to the field of automated control of a fractional distillation process. More specifically, this invention, in its preferred embodiment, relates to a method for automated control of an atmospheric crude tower of the type in which heated crude oil is broken into several component petroleum fractions. More broadly, the invention has application to automated control of any fractional distillation process.

Fractional distillation columns are employed in many processes to make desired separations of composite petroleum products into separate petroleum fractions, generally designated by a range of boiling point temperatures. The separations may range from single component separations to the more complex multiple separations performed by crude distillation towers. In distillation processes, a feed stream containing at least two petroleum fraction components is supplied to a fractional distillation column. In the column, or in a heater in which the feed is heated prior to introduction into the column, heat is supplied to the feed stream in order to effect the desired separation. Within the fractional distillation column, a portion of the feed stream comprising a lighter petroleum fraction is withdrawn as an overhead product and another portion of the feed stream comprising a heavier or "reduced" petroleum fraction is withdrawn from the bottom of the column. In distillation columns, such as crude distillation columns, where more complex separation is being performed, side products also may be withdrawn at a variety of vertical locations along the height of the column.

Various specifications are used for the product streams withdrawn from a fractional distillation column. Typically, the products are defined by ranges of boiling points into product "cuts" such as "bottoms," "heavy gas oil," etc. Each initial product cut in turn may be defined by various specifications, such as initial boiling points, end boiling points, 50% boiling points, flash points, cloud points, viscosity, etc. Since each of the initial product streams withdrawn from a crude distillation tower is, itself, a composite of petroleum products having different boiling point ranges, the product stream also may be quite accurately defined by its true boiling point curve, or "TBP curve," which illustrates graphically the portion of the product stream which will become vaporized at a given temperature point throughout the range of temperatures from the initial boiling point to the end boiling point of the product.

Many different methods have been proposed for controlling the operation of fractional distillation columns, such as crude columns, in such a manner that the product streams withdrawn from the column meet the desired product specifications. Although the product streams may be defined in terms of their true boiling point curves, historically, true boiling point curves have not been available "on line" to operators for use in controlling the operation of crude towers. Although on-line measuring instruments for determining boiling point curves of product streams have been attempted, their success has been very limited. The best on-line measurements available today are analyzers which provide only a single point on the TBP curve, for example, the 10% boiling point or the 95% boiling point. Such on-line analyzers have high maintenance requirements, are expensive and are not considered reliable. As a result, determination of true boiling point curves for a given product stream on a crude distillation tower must be developed through off-line laboratory analysis procedures, so that control of the tower, especially automated control, has not heretofore been possible on the basis of true boiling point curves.

It is accordingly an object of the present invention to provide a method for determining the true boiling point curve of a hydrocarbon fraction product withdrawn from, or circulating in, a fractional distillation column by means of on-line automated measurements.

A further object of the invention is the provision of a method for inferring the entire TBP curve for each product stream independently of the calculations used to predict TBP curves for other petroleum fraction streams in the column and in which the accuracy of an inferred curve is not dependent upon the accuracy of other curves for other product streams in the column.

A further object is to provide such a method in which the TBP curves may be inferred utilizing only conventional on-line measurements of temperatures, pressures and flow rates in the column and which does not require numerous assumptions of physical properties, the calculation of heat and/or material balances for the column, or the calculation of internal liquid and vapor flow rates.

A further object is to provide a method for automated control of a crude distillation column in which the true boiling point curves of selected product streams are calculated from on-line measurements, the calculated TBP curves are used to infer properties of product streams, the inferred properties are compared to desired product properties and the differences are used to determine adjustments in the operating parameters of the column, with the adjustments then being made automatically in order to optimize column performance.

A still further object is to provide such a method for automated control of a crude distillation column which permits simultaneous control for multiple desired properties of a product and for more than one product stream.

Another object is to provide such a control system in which the accuracy of initially assumed or estimated TBP curves may be automatically improved and updated through the use of empirically derived TBP data from laboratory analyses or on-line product analyzers.

These and other objects and advantages of the invention will be apparent from the following disclosure and description of a preferred embodiment of the invention and from the drawings in which like numerals indicate like parts and which may be briefly described as follows.

The invention is illustrated and described in terms of a preferred embodiment for monitoring and controlling the operation of a crude distillation or fractionating column. It will be appreciated, however, that the invention is applicable to any fractional distillation process in which it is desired to control the product streams within desired TBP curve ranges for product streams withdrawn from the fractional distillation process. Examples of other typical fractional distillation processes in oil refineries to which the present invention is applicable include atmospheric distillation columns, vacuum distillation columns, reforming columns, fluid catalytic cracking columns, coking columns, hydrocracking columns, and similar fractional distillation processes.

Figure 1:
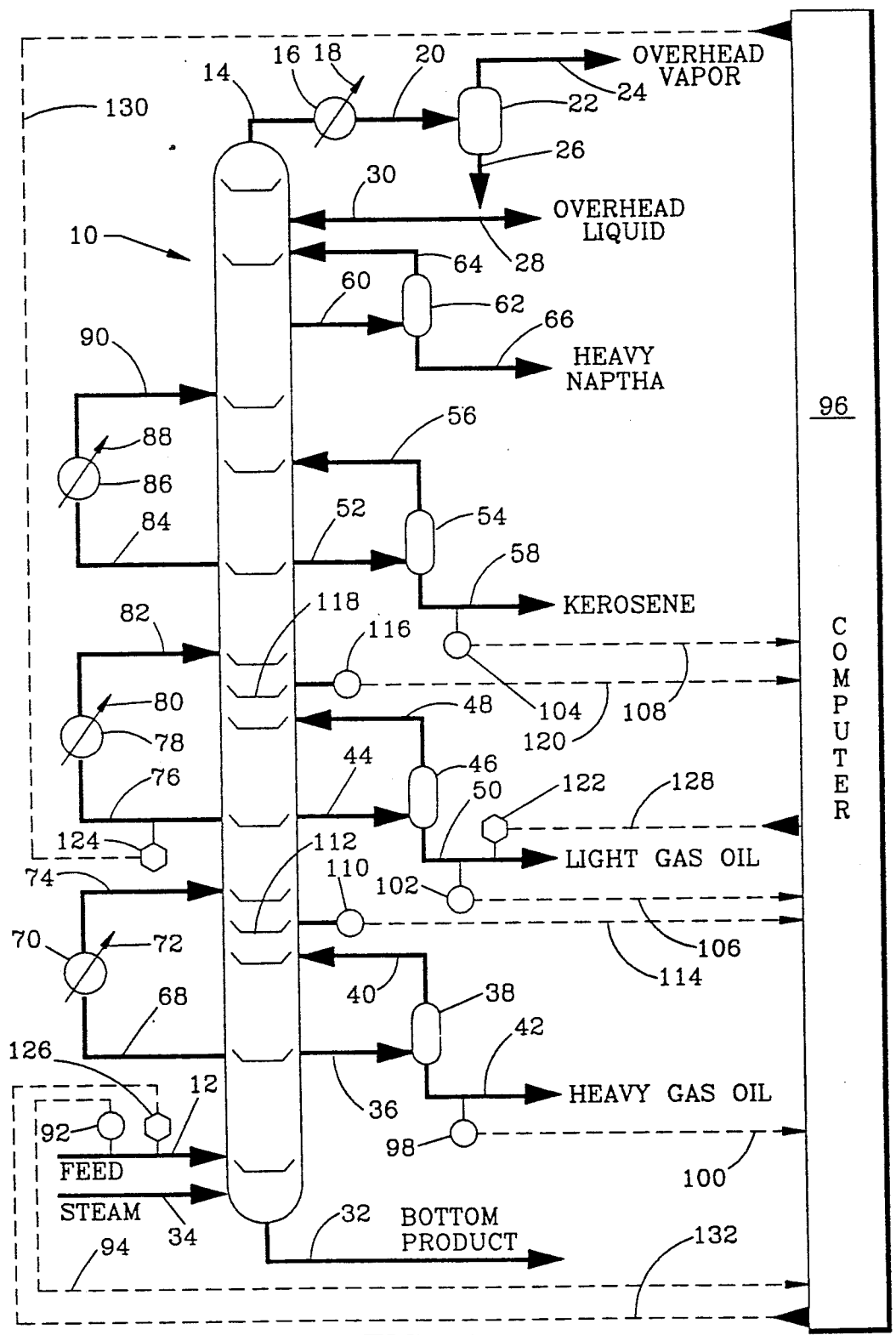
FIG. 1 is a simplified schematic illustration of a typical atmospheric distillation column and its associated control system for operating the distillation column in accordance with the present invention.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention.

Signal lines are also utilized to represent the results of calculations carried out in a digital computer and the term "signal" is utilized to refer to such results. Thus, the term "signal" is used not only to refer to electrical currents or pneumatic pressures, but is also used to refer to binary representations of a calculated or measured value.

The control devices, or "controllers," may utilize the various modes of control such as proportional, proportional-integral, proportional-derivative, or proportional-integral-derivative. In the preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in the control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. The method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is shown a fractional distillation column 10 which is utilized to fractionate a crude oil feed into a variety of petroleum products. The interior of the column 10 is provided with a plurality of vertically spaced bubble trays for providing a liquid/vapor interface throughout the length of the column. Any desired number of spacing of trays may be used, although only a limited number have been shown in FIG. 1 for illustration purposes. Alternative means for providing a liquid/vapor interface, such as packing grids may also be used. The crude oil feed is supplied to the lower portion of the distillation column 10 through conduit means 12. The crude oil feed stream generally will have been preheated prior to entering the fractional distillation column by means of a heater or furnace (not shown). Within the column, heat in the feed stream, or heat which may be added to the column through steam, a reboiler, or the like, is used to fractionate the crude oil feed stream into various liquid and vapor components.

At the top of the column, an overhead vapor stream is withdrawn through conduit means 14, through a heat exchanger 16 supplied with a cooling medium for removal of heat, indicated schematically by the arrow 18. The cooled overhead stream is supplied through conduit 20 to an accumulator 22 which also serves as a separator for liquid and vapor components. The vapor component is withdrawn through overhead conduit means 24 and the liquid through lower conduit 26. The liquid component may be withdrawn as an overhead liquid product stream through conduit 28 or returned to the upper portion of the distillation column as an external recycle or reflux stream through conduit 30.

A bottoms stream, generally containing reduced crude oil, is withdrawn from the fractional distillation column 10 through conduit means 32. Steam may be provided to the fractional distillation column through conduit means 34. Additionally, or alternatively, heat could be provided to the fractional distillation column by a fired reboiler, by circulating steam through conduits in the fractional distillation column or by other means well known to those skilled in the art.

Crude distillation columns typically include means for withdrawing a variety of side draw products such as heavy gas oil, light gas oil, kerosene, heavy naphtha and possibly others. In the schematic illustration of FIG. 1, a heavy gas oil side draw component may be withdrawn through conduit means 36 to stripper 38 where it typically is separated into an overhead component which is recirculated to the distillation column through overhead conduit 40 and a heavy gas oil product stream which is withdrawn through conduit means 42. In stripper 38 a flash to atmospheric pressure may be used to separate liquid and vapor components of the withdrawn stream or additional conventional measures such as the addition of stripping steam or reduced pressure (vacuum) may be used to aid in the separation. In like manner, conduit and vessel components 44 through 66 are provided for withdrawal of light gas oil, kerosene and heavy naphtha product streams, if desired.

Conventional crude distillation columns typically also are provided with means for withdrawing liquid streams for external recycles in which the streams are withdrawn, heated or cooled and reinjected at a different point in the column for operational control purposes. In FIG. 1, means for handling three such external recycle streams are illustrated. A recycle product corresponding to the heavy gas oil product withdrawn through line 36 may be withdrawn through conduit 68 and supplied to heat exchanger 70 for removal of heat illustrated by arrow 72, with the cooled liquid stream then being reinjected at a higher point on the column through conduit means 74. In similar manner light gas oil recycle streams and kerosene recycle streams may be handled through system components 76 through 90. Of course, fewer or more recycle streams may be utilized if desired.

In conventional crude distillation columns, means are provided for measuring temperatures, pressures and flow rates of various fluid streams for purposes of monitoring and controlling column operation. Temperature measurement conventionally is accomplished by combining a temperature measuring device, such as a thermocouple, operatively located in a conduit means or a vessel, with a transducer which converts the thermocouple measurement into an electrical signal for supply to remote devices such as an analog readout, and/or as electrical signal inputs into a process control computer. In like manner pressure transducers in combination with conventional pressure sensing devices, and flow transducers, in combination with conventional flow sensing devices, provide a plurality of electrical output signals representative of fluid pressures and fluid flow rates at monitored locations throughout the system.

Thus, in the schematic illustration of FIG. 1, element 92 represents means for sensing the temperature of the feed at the column inlet (which is substantially the same as the temperature of the feed at the furnace exit) and converting the same into an electrical signal 94 representative of such temperature for input as a signal to process control computer 96. Element 98 represents means for sensing the temperature of the fluid in conduit 42 (the heavy gas oil product), after stripping, and converting such temperature into an electrical signal 100 representative of such temperature for transmission to the process control computer. Similarly, elements 102 and 104 represent means for sensing temperatures in the light gas oil and kerosene product streams (after stripping) and converting the same into electrical signals 106 and 108 respectively for transmission to the product control computer 96. Temperatures may also be sensed at any desired point inside of the column as represented by element 110 which senses the temperature of products circulating inside the column on tray 112 and converting the same into a signal 114 for transmission to the computer 96. Temperature sensing element 116 senses the temperature of product circulating in the column at tray 118 and converts the same into an electrical signal 120 for transmission to the process control computer 96.

Although not shown, it will be appreciated by those skilled in the art that such means for sensing temperatures, pressures and fluid flow rates, and transducing the same into proportional electrical signals for transmission to readout or control devices may be provided for all of the principal fluid flow lines and for all desired trays or other internal points in the column.

Fluid flow rates in the various conduit means may be controlled by conventional fluid control means such as pumps and valves. Such pumps and valves may be operated manually; however, where automated control is desired, it is conventional practice to provide controllers which, in response to externally supplied control signals, will control the operation of the fluid control means to attain the desired fluid flow rates in the conduit means. Thus, in the schematic illustration of FIG. 1, flow control means 122 and 124 are provided for controlling the amount of flow in conduit means 50 and 76, respectively. The control means 122 and 124 are adapted to receive respective control signals 128 and 130 from the computer 96. The signals 128 and 130 are representative of the positions of the control valves or pumps which are operatively connected in the conduit means 50 and 76 for controlling the fluid flow rates in such conduit means. The fluid control means 122 and 124 contain operator means adapted to be responsive to the external signals 128 and 130 for operating the actual control valves, pumps, etc., used for controlling fluid flow rates in the conduit. In like manner, means may be provided for controlling the fluid flow rates in any of the conduits associated with the column 10 responsive to output signals from the computer. Although not shown, the fluid control means also are adapted to provide signals to the computer 96 so that it may first determine the operating condition of the fluid control means before output signals are generated for altering the operation of the fluid control means.

Crude distillation towers also provide means for controlling the temperature of the feed supply to the column. Typically these comprise means for controlling the amount of heat supplied to the feed by a furnace (not shown) upstream of the feed inlet point. In FIG. 1, means for controlling the temperature of the feed to the column are illustrated schematically by control element 126 which is adapted to receive a control signal 132 from the computer 96. The actual means for controlling the temperature may be accomplished in any desired manner. For example, the control signal 132 may operate a fluid control device on the fuel supply line to the furnace and, responsive to signal 132, may increase or reduce the amount of fuel supplied to the furnace until the temperature of the feed exiting the furnace is raised or lowered to the desired temperature point.

Figure 2:
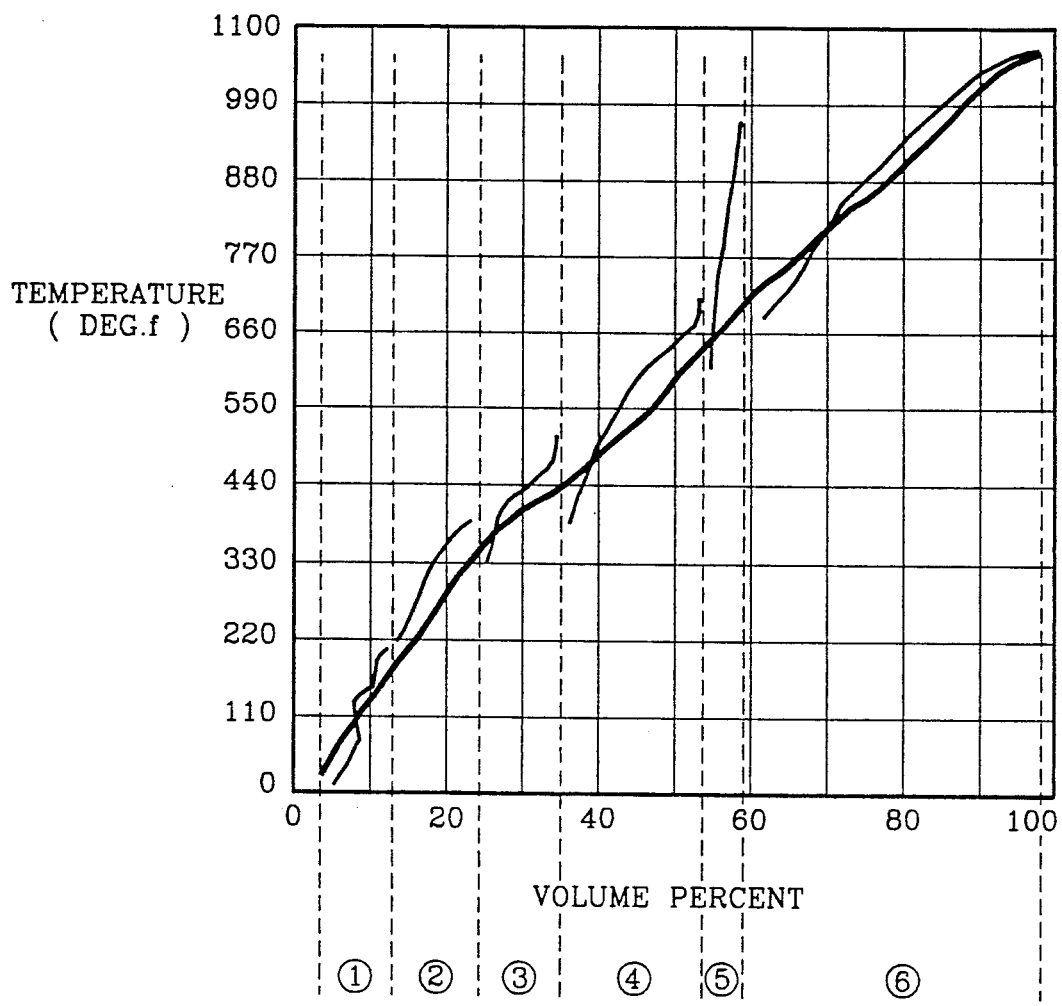
FIG. 2 illustrates a graph of typical true boiling point curves for the various product streams of the column of FIG. 1.

In accordance with the present invention, the computer 96 is adapted to receive output signals representative of operating process parameters, and to utilize such signals to calculate true boiling point curves for product streams utilizing algorithms, discussed below, programmed into the computer. FIG. 2 illustrates typical true boiling point curves for the various desired product streams of the column 10. The computer then infers from the calculated true boiling point curve selected properties of the product at the point being investigated and compares such inferred properties with desired properties previously programmed into the computer. The differences between inferred and desired product properties then are used as a basis for adjusting one or more operating parameters of the column, such as product withdrawal rates, recycle rates, etc., in order to move the column's performance incrementally towards the desired product properties. Such steps then are repeated at preselected time intervals, and at preselected fluid flow points, to move overall column operation incrementally towards optimization.

Figure 3:
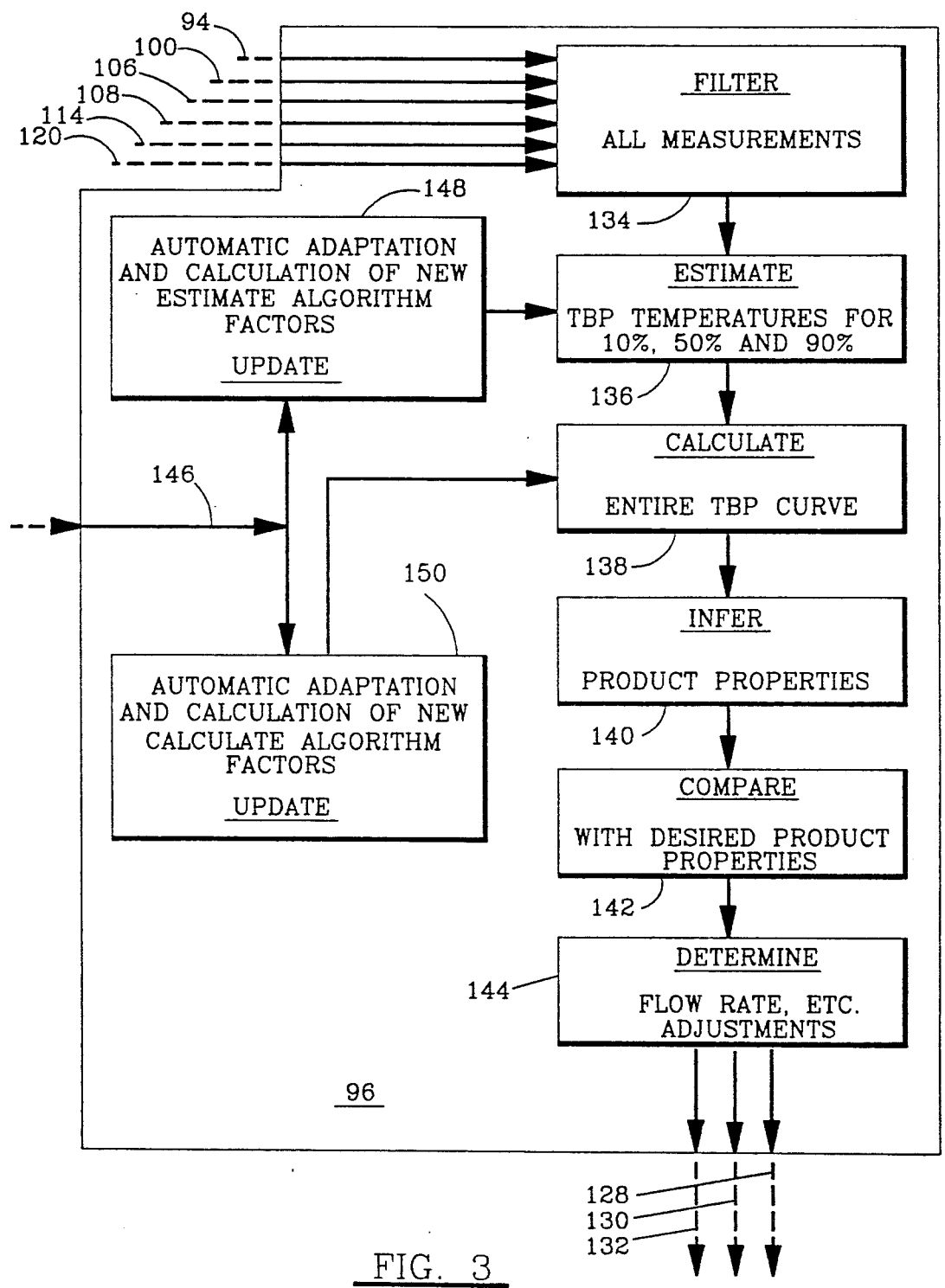
FIG. 3 is a logic diagram of the computer logic utilized to process and generate the control signals utilized in the operation and control of the distillation column of FIG. 1 in accordance with the method of the present invention.

The logic used by computer 96 to automatically control operation of the column is illustrated schematically in FIG. 3. As there shown, the computer receives control signals representative of operating parameters at measuring points in the column and its associated conduit means, vessels, etc. Although only six input signals are illustrated, it will be appreciated that any desired number of signals may be received by the computer indicative of operating parameters throughout the distillation column and associated equipment. Preferably, input signals are received by the computer 96 which are representative of at least (1) a tower pressure, (2) feed temperature to the tower, (3) the feed rate, (4) each product draw temperature (immediately after stripping), (5) each pump around or reflux liquid draw temperature, (6) tray temperatures above and below the product draws, and (7) each product flow rate.

In order to calculate an individual TBP curve for a particular product flow from the column in accordance with the present invention, four temperature measurements are necessary:

$T_1$ = the temperature of the product flow of interest (after stripping);

$T_2$ = the temperature in the column at a point between the draw tray for the product interest and the draw tray for the product stream above the product of interest or, alternatively, the temperature of the withdrawn product stream (after stripping) just above the product of interest;

$T_3$ = the temperature in the column at a point between the draw tray for the product of interest and the draw tray for the product stream below the product of interest or, alternatively, the temperature of the withdrawn product stream (after stripping) just below the product of interest; and $T_4$ = the feed inlet temperature to the column (which may be assumed to be the same as the furnace outlet temperature).

For example, in the column illustrated in FIG. 1, if the TBP curve is to be calculated for the light gas oil (LGO) product stream in conduit 50, $T_1$ would be the temperature measured by element 102, $T_2$ would be the temperature measured either by element 116 or 104; $T_3$ would be the temperature measured either by element 110 or 98 and $T_4$ would be the temperature measured by element 92. As will be apparent to those skilled in the art, product draw temperatures and pump around liquid draw temperatures may be measured either in the product lines or in the tower trays from which the liquids are drawn. Temperatures on trays immediately above or below the withdrawal trays also will give close approximations.

As illustrated in FIG. 3, the monitored column operating parameters are provided as inputs to the FILTER block 134. There measurements are checked for timing, sequence, gross accuracy (within programmed parameters), etc., in the conventional manner. The filtered signals of interest, for example, signals 106, 108, 100 and 94 for calculating the TBP curve for the light gas oil product being withdrawn from conduit 50, are then provided to the ESTIMATE block 136 and are used to estimate the temperatures of two, or preferably three, points on a product boiling point curve, such as the 10%, 50% and 90% vaporization points, or the 5%, 50% and 95% vaporization points.

In the preferred embodiment, a progression matrix, or prediction matrix, is used as the ESTIMATE algorithm for estimating the 10%, 50% and 90% vaporization point temperatures on the TBP curve for a given product stream:

$$\begin{bmatrix} T_{10\%} \\ T_{50\%} \\ T_{90\%} \end{bmatrix} = \begin{bmatrix} c_{1,1} & c_{1,2} & c_{1,3} & c_{1,4} & c_{1,5} \\ c_{2,1} & c_{2,2} & c_{2,3} & c_{2,4} & c_{2,5} \\ c_{3,1} & c_{3,2} & c_{3,3} & c_{3,4} & c_{3,5} \end{bmatrix} \times \begin{bmatrix} M_1 \\ M_2 \\ M_3 \\ M_4 \\ M_5 \end{bmatrix}$$

$$3 \times 1 \qquad\qquad 3 \times 5 \qquad\qquad 5 \times 1$$

The $M_1$ item in the matrix represents a constant equal to 1. The $M_2$ through $M_5$ matrix elements represent temperature measurements taken from the column and having the following relationship to the product stream of interest:

$M_2$ = the temperature of the products stream of interest (after stripping);

$M_3$ = the temperature in the column measured at a point between the draw tray of the product of interest and the draw tray of the next lighter product (i.e., the product being withdrawn from the column immediately above the product of interest) or, alternatively, the temperature of the product flow (after stripping) of the next lighter product being withdrawn from the column (i.e., the product being withdrawn just above the product of interest);

$M_4$ = the temperature in the column measured at a point between the draw tray of the product of interest and the draw tray of the next heavier product being withdrawn from the column (i.e., the product being withdrawn immediately below the product of interest) or, alternatively, the temperature of the product flow (after stripping) of the next heavier product (i.e., the product being withdrawn just below the product of interest); and $M_5$ = the inlet feed temperature to the column.

"$C_{1,1}$" denotes the first row, first column of the matrix. "$C_{2,1}$" denotes the second row, first column of such matrix, etc. $C_{1,1}$ through $C_{3,5}$ are derived coefficients which may be derived by those skilled in the art for any specific feed and any specific column design utilizing commercially available process simulation software packages such as "Design 2" sold by Chemshare Corp., Houston, Tex., or "Hysim" sold by Hyprotech, Inc., Calgary, Canada.

Use of such a progression matrix calculates the $T_{10}$, $T_{50}$ and $T_{90}$ vaporization points as follows:

$$T_{10\%} = (C_{1,1})(M_1) + (C_{1,2})(M_2) + (C_{1,3})(M_3) + (C_{1,4})(M_4) + (C_{1,5})(M_5)$$

or written otherwise, $$T_{10\%} = \sum_{i=1}^{i=5} C_{1,i} \times M_i$$

$$T_{50\%} = \sum_{i=1}^{i=5} C_{2,i} \times M_i$$

$$T_{90\%} = \sum_{i=1}^{i=5} C_{3,i} \times M_i$$

or more generally:

$$T_v = \sum_{i=1}^{i=5} C_i \times M_i$$

Once the 10%, 50% and 90% vaporization points on the boiling point curves have been estimated, the complete boiling point curve may be calculated by the computer in CALCULATE block 138 utilizing known TBP curve characteristics applied to the calculated points. Preferably, the entire curve is derived from three such points utilizing an exponential function and a sinusoidal correction factor as follows:

For a volume distillation fraction of interest $(V_i)$ = volume distilled (from 0 to 1.0) at a Temperature $T_i$, and using a factor $V_j = V_i - 0.5$, the CALCULATE algorithm can be written:

$$T_i = C[(e^{aV_j} - e^{aV_j})/2] + \left[\frac{T90\% + T10\%}{2}\right] \sin\left[100\, V_j\left(\frac{\pi}{\Delta v}\right)\right],$$

where $\Delta V = 50\% - 10\% = 40$ as a constant for the 10%, 50% and 90% vaporization estimate points from block 136, and wherein:

T = the temperature on the TBP curve corresponding to the desired vaporized volume fraction v;
i = the operator selected volume fraction or vaporization point (e.g., 2%, 5%, 10%, 50%, 90%, 95%, 98%, etc.);
C = a constant determined by analysis of a particular product stream in a manner known to those skilled in the art. A typical value for C is 60.
e = the exponential function;
a = a constant determined by analysis of the particular product stream in a manner known to those skilled in the art. A typical value is 3.5.
b = a constant determined by analysis of the particular stream in a manner known to those skilled in the art. A typical value is 3.0.

Where the estimated TBP points from bock 136 are other than 10%, 50% and 90% vaporization points (for example, 5%, 50% and 95%), then the algorithm is written:

$$T_i = C[(e^{aV_j} - e^{-bV_j})/2] + \left[\frac{T95\% + T50\%}{2}\right]\sin\left[100\, V_j\left(\frac{\pi}{50-5}\right)\right].$$

Once the complete true boiling point curve has been calculated in block 138, that information, in digitized form, is transmitted to the INFER block 140, where the calculated true boiling point curve is used to infer properties of the petroleum fraction under investigation (in the illustration, characteristics of the LGO product in conduit 50). Product properties such as viscosity, flash point, cloud point, pour point, etc., may be inferred from the calculated true boiling point curve based upon known relationships between TBP values and such properties. The method for calculating such relationships is known to those skilled in the art and is shown, for example, in W. L. Nelson, *Petroleum Refinery Engineering* (3d. Ed., 1949) Ch. V; J. H. Gary and G. E. Handwerk, *Petroleum Refinery Technology and Economics* (1st Ed., 1975) Chs. 3 and 4; and Watkins, *Petroleum Refinery Distillation*, (2nd Ed., 1979) Ch. 2.

In the COMPARE block 142, the inferred product properties are compared with previously input desired product properties, which would be the properties of the product stream under investigation at optimum column operation. In DETERMINE block 144, the differences between inferred and desired product properties are utilized to calculate adjustments in column operating parameters which may be made in accordance with previously programmed criteria in order to move column operation in the direction necessary to make the inferred product properties more closely approximate the desired product properties at the point under investigation (in the example, at the light gas oil product conduit 50). As a result, an output signal is created which is proportional to a desired adjustment in, for example, LGO controller 122, and is transmitted as output signal 128 to flow controller 122 to increase or decrease the draw rate of LGO product in conduit means 50. Alternatively, adjustments could be made in flow rates elsewhere in the column, in the feed rate, feed temperature, steam rate, recycle rates, etc., in accordance with pre-established criteria. The preferred manipulated variables for column control are (1) the draw rate of the product stream of interest, (2) the recycle rate of the external stream drawn from the same (or nearest) tray to the product stream of interest, and (3) the temperature of the feed.

Petrochemical and chemical plants are characterized as time varying and nonlinear systems. The response of these processes is not constant but usually depends upon the conditions that the plant is being operated at and upon the condition of the equipment in the plant. These conditions (system state) vary with time and thus the response changes with time. For example, distillation plates in a tower foul and separation efficiency gradually changes with the passing of time, heat exchangers foul, and tower loading impacts separation. Since mathematical models of a plant are not perfect and real world conditions change, it is desirable periodically to update and verify the automatic control program by means of empirically derived data relating to the distillation column product streams. Such empirical data may be obtained, for example, by periodic laboratory analyses which may empirically determine the 10%, 50% and 90% (or other) vaporization temperatures for an actual product stream, such as the light gas oil product stream from conduit 50. Alternatively, on-line analyzers may be used to establish one or more points on the boiling point curve for actual product streams. Such empirically derived TBP data may be used to automatically update and correct the Estimate and Calculate algorithms used in the automatic control program. With reference to FIG. 3, empirically derived data from laboratory analyses or on-line analyzers are supplied to the computer 96 as referenced by electronic signal 146. In the computer, such empirical data are supplied to UPDATE logic blocks 148 and 150. In block 148 the empirical data are used in an automatic adaptation and calculation of a new Estimate algorithm for the product stream of interest. In performing such updating and adaptation of the algorithm, the $T_v$ and $M_i$ factors are empirically known. The $T_v$ (for example, $T_{10\%}$, $T_{50\%}$, and $T_{90\%}$) are known from the empirical laboratory or on-line instrument measurements for the product stream and the $M_i$ measurements ($M_2$ through $M_5$) are empirically derived from measurements taken on the operating column. It then is possible to improve the matrix solution for the $C_{1,1}$ through $C_{3,5}$ coefficients (the only remaining unknown in the algorithm) in a manner known to those skilled in the art. The result is an improved Estimate algorithm which then automatically is supplied to ESTIMATE logic block 136 in place of the initial Estimate algorithm in order to update and correct performance of the control program. In a like manner, the empirically derived TBP data are supplied to logic block 150 in computer 96 where they are used to improve the accuracy of the Calculate algorithm in a similar manner, which improved algorithm then is supplied to CALCULATE block 138 for use in subsequent Calculate determinations. This process, which is repeated periodically, provides an important feedback and self correcting feature for the automatic control method of the present invention.

As will be recognized by those skilled in the art, various techniques are available for establishing new parameters, and otherwise verifying and updating the algorithms used in the ESTIMATE and CALCULATE blocks 136 and 138. These include minimizing the sum of the weighted errors squared (or raised to some other power), minimizing the weighted sum of the absolute errors, etc. Similarly, the minimization technique can involve linear or non-linear optimizers, simultaneous solution of equations, etc.

Figure 4:
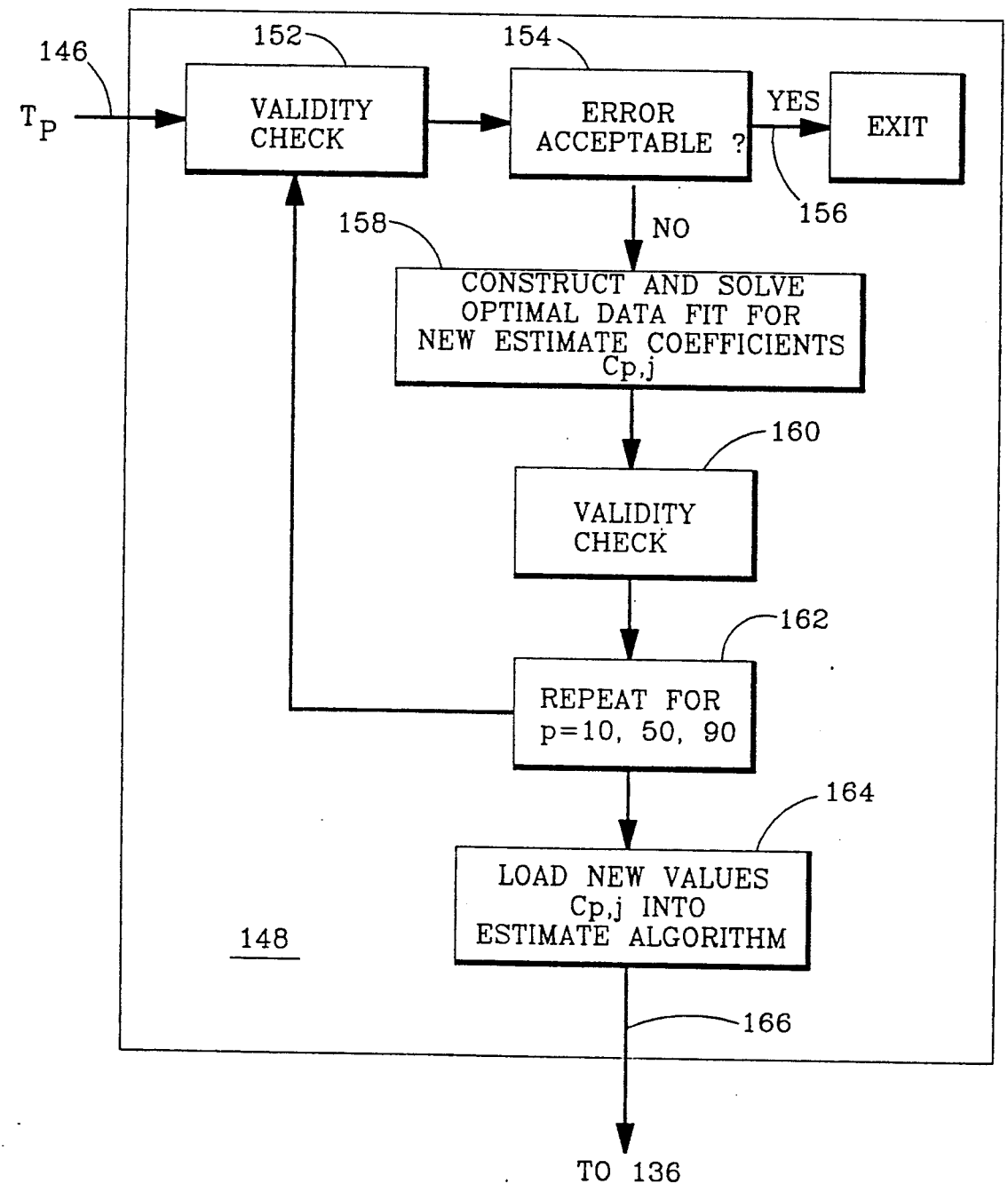
FIG. 4 is a more detailed logic diagram of a portion of FIG. 3.

Referring now to FIG. 4, there is illustrated a preferred logic diagram for the computations of the UPDATE block 148 of FIG. 3. $T_p$, which corresponds to signal 146 of FIG. 3, represents empirically derived laboratory data corresponding to a point on the true boiling point curve of the product stream of interest. Signal 146 is supplied to block 148 where it first undergoes a validity check in sub-block 152. If the new data falls within the acceptable parameters it is supplied to logic sub-block 154 for determination of whether the difference between the measured temperature and the corresponding point on the previously calculated TBP curve (i.e., the "error") is within acceptable limits. If the difference is within acceptable limits then the data signal exists the system as indicated by YES signal 156 and has no effect on the ESTIMATE algorithm of block 136. If the error as determined in logic sub-block 154 is beyond acceptable limits, then the data signal exits as "No" signal to sub-block 158 where the data $T_p$ is used to update the coefficients of the ESTIMATE algorithm to account for the empirically derived data points on the TBP curve for the stream of interest. This may be accomplished, for example, by solving the algorithm:

$$T_p(K-4) = M_1(K-4)C_{p1} + M_2(K-4)C_{p2} +$$
$$M_3(K-4)C_{p3} + M_4(K-4)C_{p4} + M_5(K-4)C_{p5}$$

$$T_p(K-3) = M_1(K-3)C_{p1} + M_2(K-3)C_{p2} +$$
$$M_3(K-3)C_{p3} + M_4(K-3)C_{p4} + M_5(K-3)C_{p5}$$

$$T_p(K-2) = \sum_{j=1}^{j=5} M_j(K-2)C_{pj}$$

$$T_p(K-1) = \sum_{j=1}^{j=5} M_j(K-1)C_{pj}$$

$$T_p(K) = \sum_{j=1}^{j=5} M_j(K)C_{pj}$$

wherein:
P = volume percent point on the TBP curve (e.g., 10%, 50%, 90%)
K = current time sample measurement
K−j = the jth sample back in time (e.g., K−1 equals the immediately preceding sample, K−2 equals the second preceding sample, K−3 equals the third preceding sample, etc.)
C = constant derived as discussed above in connection with the ESTIMATE algorithm.

In the simplest case, this produces five linear equations and five unknowns which can be solved by simultaneous equation techniques. Alternatively, and preferably, a much larger number of empirical samples, N > 5, (for example, 20 measurements) may be calculated over a time period so that we have N > 5 equations and five unknowns, which may be solved as a weighted optimization problem.

$$\text{Minimize } C_{p,i} \text{ for } i = 1 \text{ to } 5 \sum_{j=1}^{j=N} e^2{}_p(K)W_j$$

wherein $$e_p(K) = [(T_p)(K) - (T_p)(K)] = \text{actual measurement} - \text{predicted value}$$

and wherein $W_j$ = a weight value assigned by the user of the program between $0 < W_j \le 1.0$, which is commonly referred to as the least squares error solution. The resulting updated coefficients $C_i$ go through a validity check in sub-block 160 and are held in sub-block 162 for subsequent $C_i$ computations for additional points on the TBP curve (e.g., 10%, 50%, 90%) and the resulting complete new values are coefficients $C_{p,j}$ for the ESTIMATE algorithm are loaded into block 164 to provide a new ESTIMATE algorithm which then exits as signal 166 to the ESTIMATE block 136 for use in place of the previously installed algorithm.

Figure 5:
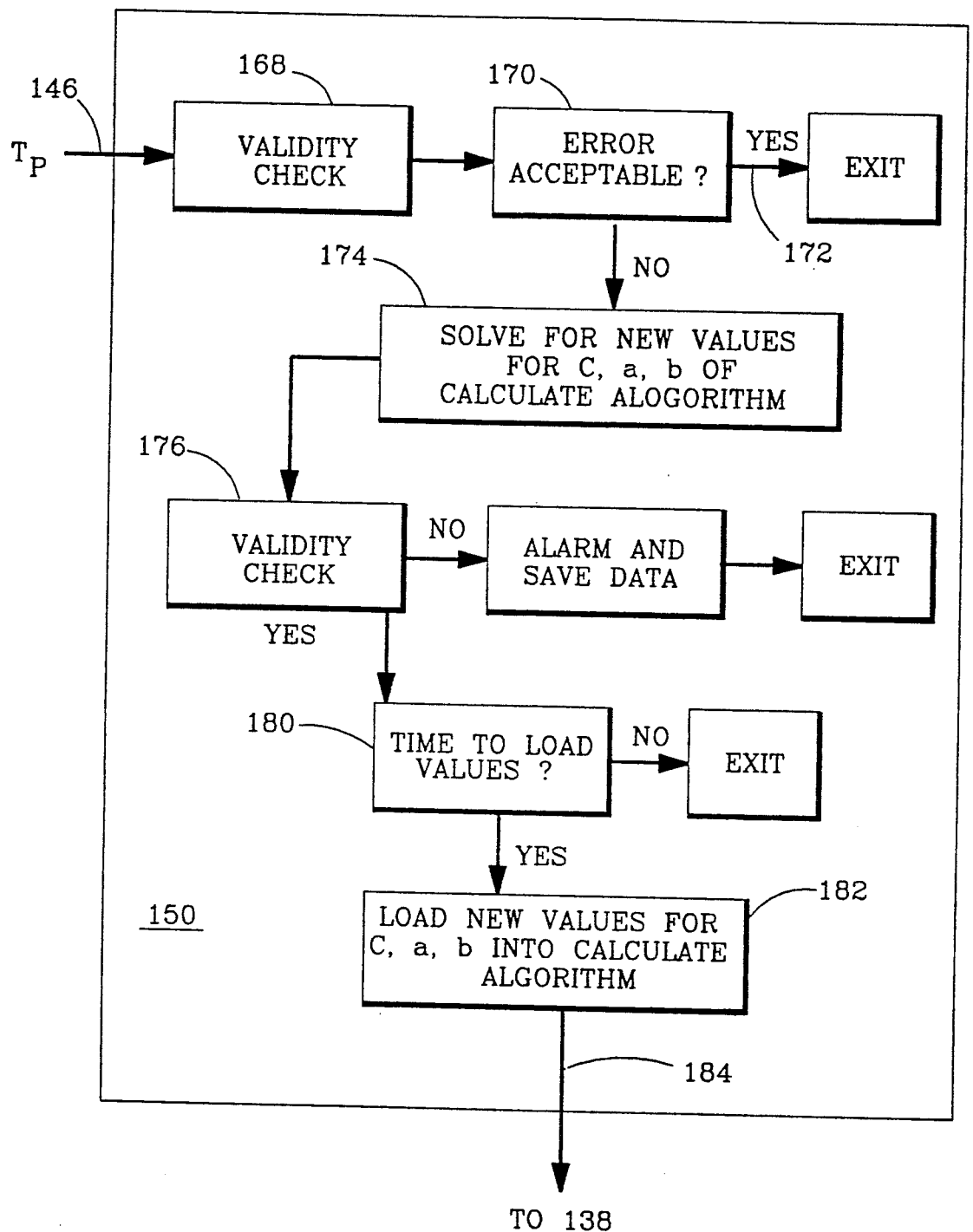
FIG. 5 is a more detailed logic diagram of another portion of FIG. 3.

Referring to FIG. 5, there is illustrated the logic diagram for UPDATE block 150 used to provide updated CALCULATE algorithms for CALCULATE block 138 of FIG. 3. Measurements $T_p$ represented by signal 146 go through a validity check in sub-block 168 and, once approved goes to block 170 for comparison of the empirically measured $T_p$ with previously calculated $T_p$'s to determine whether the difference between the two ("error") is acceptable and, if so, exits as "Yes" signal to block 172, indicating that no change will be made in the CALCULATE algorithm of block 138 based upon the measurement. If the error is outside of acceptable parameters, it exits to block 174 where the $T_p$ data is used to solve a non-linear equation fit for three equations in three unknowns (c, a, b) using:

$$T_i = C[(e^{avj} - e^{-bvj})/2] + \left[\frac{T_{90} + T_{10}}{2}\right] \text{sine}[(100 V_{jn}/40)]$$

wherein
i=0.1, 0.5, 0.9, etc.
j=i−0.5
The new solutions for c, a, and b of the CALCULATE algorithm exit to validity check 176 where they are compared with pre-stored acceptable parameters and then go, via "time to load" block 180 to load block 182 where they are used to load new values for c, a, and b into the CALCULATE algorithm and exit as a signal 184 to CALCULATE block 138 of FIG. 3 to replace the previously loaded CALCULATE algorithm in block 138.

Although the procedure for the UPDATE block 150 is illustrated in terms of three values of $T_i$ (10%, 50% and 90%), if more values for $T_i$ are used, then a non-linear optimization may be used to solve for the best fit of the N>3 equations in three unknowns.

Although the operation of the system is illustrated in connection with the LGO product stream withdrawn from conduit 50, it will be appreciated that the computer 96 will be programmed to sequentially monitor operating parameters in any of a pre-established number of fluid conduits, or other points in the column 10, and to repeat the Filter, Estimate, Calculate, Infer, Compare, Determine and Update steps illustrated above in order to incrementally adjust column operation at the monitored points toward optimum operation (where the inferred and desired product properties for each product stream most closely agree) which, in turn, produces optimum operation of the overall column.

The foregoing invention has been described in terms of a preferred embodiment as illustrated in FIGS. 1 through 5. Specific components used in the practice of the invention as, for example, flow, temperature and pressure sensors, flow, temperature and pressure transducers, flow control means such as valves and pumps, electrical and pneumatic controllers for valves and pumps, and other elements of the control system illustrated, are well known and are commercially available through a variety of suppliers. Representative examples of such control components are described and illustrated, for example, in *Perry's Chemical Engineers Handbook*, 4th Ed., Ch. 22, McGraw-Hill.

Although the foregoing invention has been described in terms of the presently preferred embodiment, various changes and modifications are possible in the details of the method and the apparatus used for performing the method, and the like, within the scope of the following claims, without departing from the spirit of the invention.

What is claimed is:

1. A method for controlling the operation of a petroleum fractional distillation column, wherein a feed stream is provided to said fractional distillation column and a plurality of petroleum fraction product streams are withdrawn from said fractional distillation column, said method comprising the steps of:
   a) providing a composite feed stream to the column;
   b) withdrawing a plurality of product streams from the column by a like number of product stream conduits;
   c) flowing a stream of material through a first recycle conduit from a first location in the column to a second location in the column;
   d) selecting a product stream of interest;
   e) measuring the temperature of said selected product stream of interest and establishing a first signal representative of said first measured temperature;
   f) measuring one of the temperatures selected from the group consisting of the temperature of the product stream being withdrawn from said column immediately above said product stream of interest and the temperature in said column at a point between the point of withdrawal of said product stream of interest and the point of withdrawal of said product stream being withdrawn from said column immediately above said product stream of interest and establishing a second signal representative of said second measured temperature;
   g) measuring one of the temperatures selected from the group consisting of the temperature of the product stream being withdrawn from said column immediately below said product stream of interest and the temperature in said column at a point between the point of withdrawal of said product stream of interest and the point of withdrawal of said stream being withdrawn from said column immediately below said product stream of interest and establishing a third signal representative of said third measured temperature;
   h) measuring the temperature of said feed stream and establishing a fourth signal representative of said fourth measured temperature, wherein the steps of measuring the first, second, third and fourth temperatures may be carried out in any order;
   i) transmitting said first, second, third and fourth signals to a digital computer programmed with a first algorithm and a second algorithm;
   j) utilizing said first, second, third and fourth signals and said first algorithm to estimate in said computer selected points on a true boiling point curve for said product stream of interest;
   k) using said estimated points on said true boiling point curve and said second algorithm to calculate in said computer a substantially complete true boiling point curve for said selected product stream of interest;
   l) using said calculated true boiling point curve to infer selected properties of said selected product stream of interest;
   m) comparing said inferred properties with desired properties of said product stream of interest;
   n) using the differences between said inferred properties and said desired properties to determine an adjustment to be made in at least one selected operating parameter of said fractional distillation column;

o) establishing a fifth signal representative of said desired adjustment of said selected operating parameter of said distillation column;
p) transmitting said fifth signal to a control device of said fractional distillation column; and
q) adjusting the operation of said control device responsive to said fifth signal in order to adjust the operation of said fractional distillation column.

2. The method according to claim 1 wherein said temperatures of said product stream of interest, said product stream above said product stream of interest and said product stream below said product stream of interest are measured after stripping of said product streams.

3. The method according to claim 1 comprising additionally the steps of establishing a sixth signal representative of at least one empirically determined point on the true boiling point curve of said product stream of interest;
transmitting said sixth signal to said digital computer;
utilizing said sixth signal in said digital computer to update said first algorithm; and
utilizing said updated first algorithm to estimate said selected points on said true boiling point curve for said product stream of interest.

4. The method of claim 1 comprising additionally the steps of:
establishing a sixth signal representative of at least one empirically determined data point on said true boiling point curve of said selected product stream;
transmitting said sixth signal to said digital computer;
utilizing said sixth signal to update said second algorithm; and
utilizing said updated second algorithm to calculate said substantially complete true boiling point curve for said selected product stream of interest.

5. The method according to claim 1 comprising additionally:
repeating the steps of claim 1 for a plurality of product streams and a plurality of recycle conduits of said fractional distillation column.

6. The method according to claim 1 comprising additionally:
repeating the steps of claim 1 at preselected time intervals in order to periodically adjust the operation of said fractional distillation column.

7. The method according to claim 1 wherein said flow control device controls the flow volume of one of said product stream of interest and a recycle stream withdrawn from said column at substantially the same level as said product stream of interest.

8. The method according to claim 1 wherein said control device controls the temperature of said feed stream.

9. The method according to claim 1 wherein said first algorithm comprises:

$$T_v = \sum_{i=1}^{i=5} C_i \times M_i$$

wherein $T_v$ is the estimated temperature on the true boiling point curve for the product stream of interest corresponding to a vaporized volume fraction v, $M_i$ is the ith measured temperature, and $C_i$ is a constant value for $M_i$ based on the feed stream and the column.

10. The method according to claim 9 comprising additionally the steps of:

a) establishing a sixth signal representative of at least one empirically determined point on the true boiling point curve of said product stream of interest;
b) transmitting said sixth signal to said digital computer programmed with a third algorithm $$T_p = \sum_{j=1}^{j=5} M_j(K-j)C_{pj}$$

wherein $T_p$ is the temperature on the true boiling point curve for the product stream of interset corresponding to the p volume percent point K−j is the jth sample back in time, $M_j$ is one for j=1, and, for j=2 through 5, $M_j$ are measurements empirically derived from measurements taken on the operating column, and $C_{pj}$ refers to coefficients;
c) utilizing said sixth signal and said third algorithm to obtain updated coefficients $C_i$, thereby updating said first algorithm; and
d) repeating the steps of claim 1, utilizing said updated first algorithm to estimate said selected points on said true boiling point curve for said product stream of interest.

11. The method according to claim 1 wherein said second algorithm comprises:

$$T_i = C[(e^{V_j} - e^{-bV_j})/2] + \left[\frac{T_{90\%} + T_{10\%}}{2}\right]\sin\left[100\ V_j\left(\frac{\pi}{\Delta v}\right)\right]$$

wherein $T_i$ is the temperature on the true boiling point curve for the product stream of interest corresponding to the ith vaporized volume fraction, $V_j$ is $V_i - 0.5$, $T_{90\%}$ is the temperature on the true boiling point curve for the product stream of interest corresponding to 90% vaporization by volume, $T_{10\%}$ is the temperature on the true boiling point curve for the product stream of interest corresponding to 10% vaporization by volume, $\Delta v$ is 50%−10% and C, a and b are constants based on the product stream of interest.

12. The method according to claim 11 comprising the additional steps of:

a) establishing a sixth signal representative of at lease one empirically determined point on the true boiling point curve of said product stream of interest;
b) transmitting said sixth signal to said digital computer programmed with a third algorithm $$T_i = C[(e^{aV_j} - e^{-bV_j})/2] + \left[\frac{T_{90\%} + T_{10\%}}{2}\right]\sin\left[100\ V_j\left(\frac{\pi}{j40}\right)\right]$$

wherein $T_i$ is the temperature on the true boiling point curve for the product stream of interest corresponding to the ith vaporized volume fraction, $V_j$ is i−0.5, $T_{90\%}$ is the temperature on the true boiling point curve for the product stream of interest corresponding to 90% vaporization by volume, $T_{10\%}$ is the temperature on the tube boiling point curve for the product stream of interest corresponding to 10% vaporization by volume, and C, a and b are constants based on the product stream of interest;

c) utilizing said sixth signal and said third algorithm to obtain updated constants C, a and b thereby updating said second algorithm; and
d) repeating the steps of claim 1, utilizing said updated second algorithm to calculate said substantially complete true boiling point curve for said selected product stream of interest.

13. The method according to claim 1 comprising additionally filtering said first, second, third and fourth signals before they are utilized in step j to estimate said points on said true boiling point curve.

14. The method according to claim 1 comprising additionally repeating the steps of claim 1 for at least one different selected product stream of interest.

* * * * *